(12) United States Patent
Edwards

(10) Patent No.: US 6,254,147 B1
(45) Date of Patent: Jul. 3, 2001

(54) FLUID-TIGHT CONNECTING APPARATUS

(75) Inventor: Jeffrey Charles Edwards, Scotland (GB)

(73) Assignee: Expro North Sea, Limited (GB)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/700,400
(22) PCT Filed: Feb. 20, 1995
(86) PCT No.: PCT/GB95/00345
 § 371 Date: Sep. 19, 1996
 § 102(e) Date: Sep. 19, 1996
(87) PCT Pub. No.: WO95/23908
 PCT Pub. Date: Sep. 8, 1995

(30) Foreign Application Priority Data

Mar. 3, 1994 (GB) .................................................. 9404052

(51) Int. Cl.⁷ .................................................... F16L 25/00
(52) U.S. Cl. .................................. 285/334.4; 285/334.2; 285/912
(58) Field of Search ........................... 285/334.2, 334.4, 285/912

(56) References Cited

U.S. PATENT DOCUMENTS

| | | | |
|---|---|---|---|
| 3,239,245 | * | 3/1966 | Press et al. ..................... 285/912 X |
| 4,795,198 | * | 1/1989 | Hjelset .............................. 285/912 X |
| 5,058,929 | * | 10/1991 | Zentner et al. .................. 285/912 X |
| 5,176,409 | * | 1/1993 | Brooks .......................... 285/334.4 X |

* cited by examiner

Primary Examiner—Teri Pham Luu
(74) Attorney, Agent, or Firm—Gifford, Krass, Groh, Sprinkle, Anderson & Citkowski, P.C.

(57) ABSTRACT

A fluid-tight coupling (2) for connecting opposite ends of the pipe section (4, 6) to provide a fluid-tight Al seal is described. The fluid-tight seal between the upper and lower tubular sections is provided by an upper and a lower metal-to-metal seal produced respectively between a lower sealing surface (10) of the upper pipe section (4) and an upper sealing surface (12) of an annular interface member (8) and an upper sealing surface (14) of the lower section (6) and a lower sealing surface (16) of the annular interface member (8). The metal-to-metal seals are produced and maintained by a collar (20) arranged coaxially about the coupling region of the tubular sections. The collar (20) is coupled by threads (24, 26) to the upper and lower pipe sections and rotation of the collar (20) in one direction brings the sections (4, 6) together comprising the interface member (8) and deforming at least one sealing surface of each pair of sealing surfaces (10, 12) and (14, 16) to increase the contact area and provide metal-to-metal seals. Embodiments and applications of the invention are described.

11 Claims, 1 Drawing Sheet

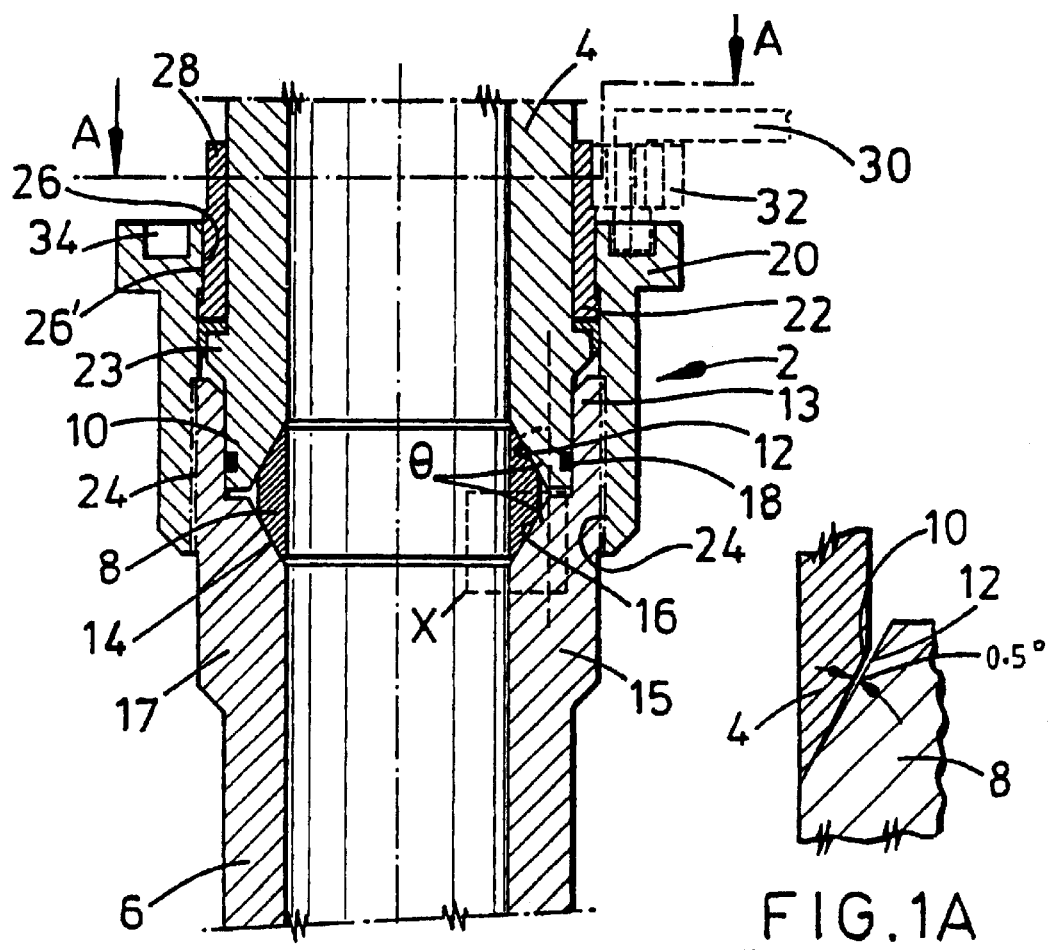
FIG.1
FIG.1A
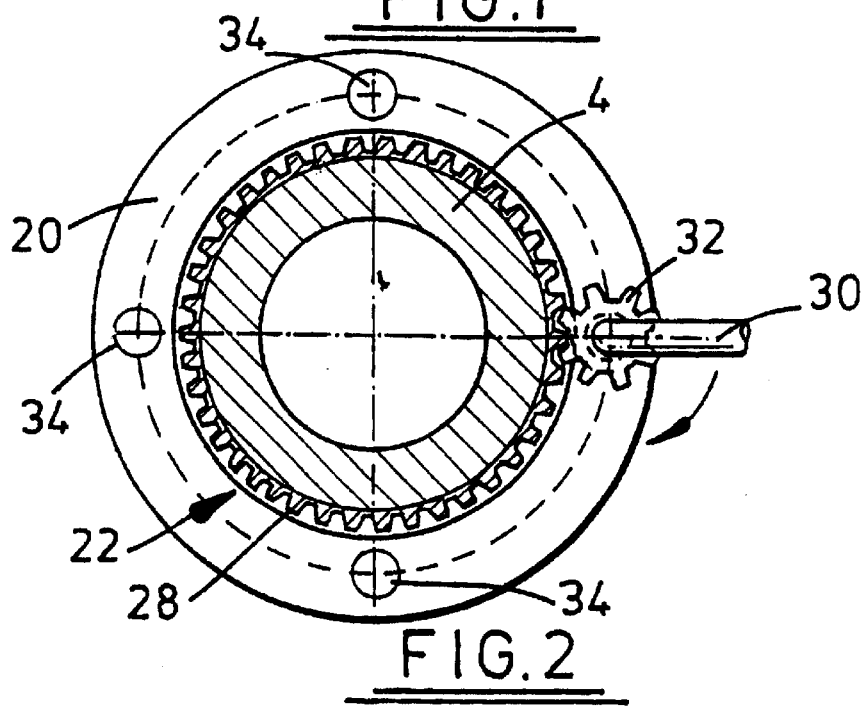
FIG.2

FLUID-TIGHT CONNECTING APPARATUS

FIELD OF THE INVENTION

This invention relates to fluid-tight connectors and in particular, though not necessarily, to wireline type fluid-tight connectors for providing metal-to-metal seals between opposed ends of tubes making up a pressure bearing string.

BACKGROUND OF INVENTION

A known type of fluid-tight connector means for connecting together opposite ends of two pipes, or tubes, comprises flanges provided on the ends of the pipes to be joined. A fluid-tight seal between the tubes may be obtained by bolting the flanges together around the circumference of the pipes. It is difficult and time consuming, however, to provide a circumferentially uniform seal with such an arrangement and, in order to improve the uniformity, it is common to insert an annular elastomeric gasket between the opposed flanges. It is often undesirable, however, to use elastomeric gaskets in hostile environments, such as those involving high temperatures, high pressures, or corrosive fluids in which they are likely to quickly decompose. In such hostile environments it is necessary to rely only upon metal-to-metal seals and to accept the above mentioned disadvantages.

SUMMARY OF THE INVENTION

According to a first aspect of the present invention there is provided coupling means for enabling the fluid-tight coupling of opposed ends of first and second substantially tubular members by means of a pair of metal-to-metal seals, the coupling means comprising first and second metal sealing surfaces extending circumferentially around end regions of the first and second tubular members respectively, and a substantially annular interface member having circumferentially extending and axially spaced third and fourth metal sealing surfaces, the interface member being arranged in use between the coupling ends of the tubular members so that, with substantially no force being applied between member, said first and second sealing surfaces oppose, but are not aligned with, respective ones of the third and fourth sealing surfaces, the coupling means further comprising means for forcing said opposed ends of the tubular members together in a sense tending to compress the interface member, wherein at least one sealing surface of each pair of opposed surfaces is of a metal which is deformable under the action of the forcing means so as to increase the area of contact between the sealing surfaces of each pair of opposed surfaces, thereby to provide said metal-to-metal seals.

In a preferred embodiment of the invention, the sealing surfaces of the tubular members and of the interface member are arranged so that in use they do not lie in a plane perpendicular to the direction of the force applied by the forcing means. The sealing surfaces of each pair of opposed surfaces are misaligned in use, prior to compression, by less than 5°, preferably by less than 1.5° and more preferably still by approximately 0.50°. Compression of said deformable metal forces said adjacent surfaces substantially into alignment.

Preferably, said sealing surfaces are frustoconical. Preferably, the interface member is comprised of said deformable material. It will be clear, however, that the portion of the tubular members providing the first and second sealing surfaces could alternatively comprise deformable metal or that both these portions and the interface member could comprise deformable metal. Said deformable metal is preferably an alloy containing copper/beryllium, phosphor/bronze, or aluminium/bronze.

Preferably, the force applying means is arranged to distribute the applied force evenly around the circumferences of the tubular members, for example by engaging one or both of the tubular members by way of a screw thread.

Preferably, the force applying means comprises a substantially cylindrical collar for positioning coaxially around the opposed ends of the tubular members to be coupled. The collar is arranged to moveably engage at least one of said opposed ends, for example by means of an axially extending screw thread. Preferably, the collar moveably engages both of the opposed ends by means of axially extending, but oppositely directed, screw threads so that rotation of the collar about the tubular member forces said opposed ends together. Rotation of the collar may be achieved, for example, by means of a ratchet type tool arranged to be located in a locating recess on the collar and to engage teeth spaced around a circumferential region of one of the tubular members or around an intermediate surface mounted thereon.

It will be apparent that embodiments of the invention may provide a connector which makes use of metal-to-metal seals and which can be used to quickly connect and disconnect tubular members. Moreover, the metal-to-metal seals may be achieved uniformly around the circumference of the connection. Such connectors are particularly suitable for use in hostile environments, especially in high pressure/high temperature oil wells.

According to a second aspect of the present invention there is provided a method of coupling together opposed ends of first and second substantially tubular members to provide a fluid tight seal therebetween by way of a pair of metal-to-metal seals, the method comprising:

providing first and second metal sealing surfaces extending circumferentially around end regions of the first and second tubular members respectively;

axially aligning said opposed ends of the first and second tubular members, providing a substantially annular interface member having circumferentially extending and axially spaced third and fourth metal sealing surfaces;

disposing the interface member between said opposed ends of the tubular members so that the interface member is axially aligned with the tubular members and so that the first and second sealing surfaces oppose, but are not aligned with, respective ones of the third and fourth sealing surfaces; and forcing said opposed ends together in a sense tending to compress the interface member, at least one sealing surface of each pair of opposed surfaces being of a metal which is deformable under the influence of the forcing action so as to increase the area of contact between the sealing surfaces of each pair of opposed sealing surfaces, thereby to provide said metal-to-metal seals.

Preferably, the step of forcing the opposed ends of the tubular members together comprises the step of arranging a substantially cylindrical collar coaxially around the opposed ends, so as to engage axially extending screw threads provided on both said opposed ends, and rotating the collar around the opposed ends. Rotation of the collar may be achieved by means of a mechanical advantage tool acting between the collar and one of the opposed ends.

According to a third aspect of the invention there is provided a method of coupling together opposed ends of first and second substantially tubular members to provide a fluid tight seal therebetween by way of a pair of metal-to-metal seals, the method comprising the steps of:

axially aligning said opposed ends of the tubular members so that they are spaced apart;

disposing a deformable interface member between the opposed ends so that first and second metal sealing surfaces, extending circumferentially around end regions of the first and second tubular members respectively, abut, but are not aligned with, respective ones of third and fourth circumferentially extending and axially spaced metal sealing surfaces of the interface member; and, forming said pair of metal-to-metal seals by converting a rotational motion about the common axis to an axial compressive force thereby to deform the interface member to bring the sealing surfaces of the two pairs of abutting sealing surfaces into alignment.

BRIEF DESCRIPTION OF THE DRAWINGS

These and other aspects of the invention will become apparent from the following description when taken in combination with the accompanying drawings in which:

Fig. 1 shows an axial cross-sectional view of a connection means for connecting two tubular sections of a drill string;

FIG. 1a shows a detail of FIG. 1; and

FIG. 2 shows a transverse cross-sectional view of the connection means of FIG. 1 taken on the line A—A.

FIG. 1 shows a cross-sectional view of a coupling means for enabling the fluid-tight coupling of an upper and a lower tubular section 4,6, both sections having a generally circular cylindrical construction as shown in FIG. 2. A plurality of tubular sections may be coupled, end to end, in like manner to form, for example, a test string for location in a wellbore. In particular, the fluid-tight seal between the upper and lower tubular sections is provided by an upper and a lower metal-to-metal seal produced respectively between a lower sealing surface 10 of the upper section 4 and an upper sealing surface 12 of an annular interface member 8 and an upper sealing surface 14 of the lower section 6 and a lower sealing surface 16 of the annular interface member 8. The metal-to-metal seals are produced and maintained by a collar 20 arranged coaxially about the coupling region of the tubular sections.

DETAILED DESCRIPTION OF THE PREFERRED EMBODIMENTS

Considering the coupling region in more detail, the lower sealing surface 10 of the upper section 4 is a frustoconical surface provided by a chamfered edge which is oriented at an angle of approximately 30° with respect to the central axis of the upper section and which extends circumferentially around the inside lower end of the upper section. The lower section 6 is provided at its upper end with a cylindrical receiving section 13 of reduced thickness. A strengthening section 15 of enlarged thickness is provided between the receiving section and the main body 17 of the lower section. A chamfered edge, similar to that provided on the upper section 4, is formed on the shoulder between the receiving section 13 and the strengthening section 15 to provide a frustoconical surface forming the upper sealing surface 14 of the lower section 6. A screw thread, indicated generally by reference numeral 24, is provided on the outer surface of the lower section 6 and extends axially from the top of the receiving section 13 to a position part way along the strengthening section 15.

The annular interface member 8 is provided by a short cylindrical member whose inside diameter is approximately equal to the inside diameter of the tubular sections. The outer, upper and lower edges of the annular interface member are chamfered to provide upper and lower frustoconical sealing surfaces 12,16 which extend circumferentially around the interface member.

FIG. 1a shows an enlarged detail of the region "X" shown dotted in FIG. 1. As will be seen, the upper and lower sealing surfaces of the interface member 8 are oriented at an angle with respect to the central axis of the interface member so that when the interface member is coaxially arranged between the ends, and with no force being applied across the boundary between the sealing surfaces of the interface member and of the upper and lower sections, the two pairs of opposed surfaces diverge from the interior surface at an angle of approximately 0.5°.

Whilst the upper and lower sections 4,6 are of a substantially non-compressible metal, for example stainless steel, the interface member 8 is of a compressible metal alloy, for example copper/beryllium, phosphor/bronze or aluminium/bronze.

The coupling means 2 is provided with a force applying mechanism for forcing the upper and lower sections together in a sense tending to compress the interface member 8. The force applying mechanism comprises a substantially cylindrical collar 20 which is provided on its lower internal surface with a first screw thread, generally indicated by reference numeral 24', which extends axially from the bottom of the collar to a position approximately midway along the collar. The collar for engagement with screw thread 24 is also provided with a second screw thread, generally indicated by reference numeral 26, on its upper internal surface, which extends axially from the top of the collar to a position approximately a quarter of the way long the collar. A cylindrical bearing 22 is arranged coaxially about the end of the upper section 4 with its axial position being maintained by the engagement of the lower edge of the bearing with a supporting shoulder 23 which projects outwardly from, and extends circumferentially around, the upper section. The bearing 22 is free to rotate about the upper section 4 and is provided on its outer surface with a screw thread 26' which extends axially from a position near the bottom of the bearing to a position just over midway along it. In order to couple the upper and lower sections together, the lower section 6 is first secured in an upright position. The interface member 8 is then coaxially positioned inside the lower section through its upper opening so that the lower frustoconical sealing surface 16 of the interface member 8 contacts the frustoconical sealing surface 14 of the lower section. It will be appreciated from a consideration of FIG. 1a that the initial area of contact between the adjacent sealing surface is small and comprises only a substantially circular contact zone.

The upper section 4 is then axially aligned above the opening in the lower section 6 and is lowered until its frustoconical sealing surface 10 contacts the upper frustoconical sealing surface 12 of the interface member 8, again over a substantially circular contact zone. The bearing 22 is generally arranged about the upper section prior to the lowering of the upper section.

The collar 20 is then lowered over the upper section. The collar is arranged so that its lower screw thread is recessed slightly into its inner wall thereby allowing the collar to pass freely over the bearing 22 until the lower screw thread of the collar engages the corresponding screw thread provided on the outer surface of the lower section.

With reference to FIG. 2 of the drawings, which shows a cross-sectional view of the coupling means taken on a line A—A of FIG. 1, the force applying mechanism is operated by means of a ratchet type tool 30, or other force multiplying tool which makes use of mechanical advantages, which is secured in one of four recesses 34 spaced at 90° intervals around the upper surface of the collar 20. The ratchet 30 is provided with a circular end piece in which are formed a plurality of teeth 32 spaced so as to engage similarly spaced teeth 28' provided circumferentially around the outer surface of the bearing 22. The ratchet is manually rotated about the central axis of the recess in the direction indicated by the arrow in FIG. 2. Movement in this direction causes the collar to screw down over the lower section 6.

The screwing down of the collar over the lower tubing string continues until the upper screw thread 26 provided on the inner surface of the collar engages the corresponding screw thread 26' provided on the outer surface of the bearing 22. The two pairs of screw threads 24, 24' and 26, 26' are arranged so that continued action by the ratchet in the indicated direction, in addition to drawing the lower section upwards relative to the collar, causes the upper section to move downwardly relative to the collar. Thus, the upper and lower sections are drawn together in a sense tending to compress the interface member 8. As the force applied across the two pairs of adjacent sealing surfaces increases, the interface member 8, which is of a compressible metal alloy, is compressed with the result that the two pairs of opposed sealing surfaces are forced together. The ratchet action is continued until metal-to-metal seals of appropriate extent are obtained. It will be appreciated that the force applied across the sealing surface is substantially uniformly distributed around the circumferences of the seals thus reducing the risk that the tubes will be misaligned.

The point at which appropriate seals are obtained can be determined by a number of known techniques: for example, by pressure testing the seal or by means of a force gauge on the ratchet.

It is envisaged that, instead of producing the alignment of adjacent sealing surfaces by use of a compressible metal, alignment may be enabled by forming at least one surface of each pair of adjacent surfaces so as to be deflectable under the application of forces produced by the force applying mechanism.

The coupling means additionally comprises an elastomeric O-ring 18 located in a circumferentially extending recess in the outer surface of the upper section. The O-ring projects sufficiently from the recess to contact the inner surface of the receiving section of the lower section. The O-ring serves as a secondary fluid seal means which is normally isolated from the fluid flowing through the tubing strings but which serves to prevent fluid leakage in the event that the metal-to-metal seals fail or are loosened. The coupling means described above has been described in general terms and it will be appreciated that it can be used in a wide range of applications where metal-to-metal seals are required. It is envisaged that a particular application is in the area of wellbore tools for siting in high pressure/high temperature (HPHT) oil wells.

The embodiments described above are for the purpose of illustration and it will be apparent that variations may be made within the scope of the invention. For example, the seals may be engaged by means of an electrically or hydraulically operated tool rather than by means of a manually operated tool.

What is claimed is:

1. Coupling means for enabling the fluid-tight coupling of opposed ends of first and second substantially tubular members by means of a pair of metal-to-metal seals, the coupling means comprising first and second metal sealing surfaces extending circumferentially around respective coupling ends of the first and second tubular members respectively, and a substantially annular interface member having circumferentially extending and axially spaced third and fourth metal sealing surfaces, the interface member being disposed between the coupling ends of the tubular members so that, with substantially no force being applied between the tubular members and the interface member, said first and second sealing surfaces oppose, but are not aligned with, respective ones of the third and fourth sealing surfaces, the coupling means further comprising means for forcing said coupling ends of the tubular members together to compress the interface member therebetween, said means for forcing comprising a substantially cylindrical collar positionable coaxially around the coupling ends of said tubular members for engagement with a first of said members, and a bearing disposed coaxially between said collar and a second of said tubular members, said bearing having an outer surface provided with a plurality of teeth for engagement with mating teeth of a ratchet, said bearing being operative to distribute applied force evenly around the circumferences of the tubular members by engaging said second of the tubular members by way of a first axially extending screw thread, wherein at least one sealing surface of each pair of opposed surfaces is of a metal which is deformable under action of the forcing means so as to increase an area of contact between the sealing surfaces of each pair of opposed surfaces, thereby to provide said metal-to-metal seals.

2. Coupling means as claimed in claim 1 wherein the sealing surfaces of the tubular members and of the interface member are arranged so that in use they do not lie in a plane perpendicular to the direction of the force applied by the forcing means.

3. Coupling means as claimed in claim 1 wherein the sealing surfaces of each pair of opposed surfaces are misaligned in use, prior to compression, by an angle which ranges from 5° to approximately 0.5°.

4. Coupling means as claimed in claim 1 wherein said sealing surfaces are frustoconical.

5. Coupling means as claimed in claim 1 wherein the interface member is comprised of said deformable metal.

6. Coupling means as claimed in claim 1 wherein the respective end regions of the tubular members providing the first and second sealing surfaces comprise deformable metal and the interface member comprises deformable metal.

7. Coupling means as claimed in claim 1 wherein said deformable metal is an alloy of copper/beryllium, phosphor/bronze or aluminium/bronze.

8. Coupling means as claimed in claim 1 wherein the collar moveably engages said first of said tubular members by means of an axially extending second screw thread.

9. Coupling means as claimed in claim 8 wherein said first and second screw threads axially extend in opposite directions such that rotation of the collar about the tubular member forces said coupling ends together.

10. A method of coupling together opposed ends of first and second substantially tubular members to provide a fluid tight seal therebetween by way of a pair of metal-to-metal seals, the method comprising:

providing first and second metal sealing surfaces extending circumferentially around end regions of the first and second tubular members respectively;

axially aligning said opposed ends of the first and second tubular members, providing a substantially annular interface member having circumferentially extending and axially spaced third and fourth metal sealing surfaces; disposing the interface member between said opposed ends of the tubular members so that the interface member is axially aligned with the tubular members and so that the first and second sealing surfaces oppose, but are not aligned with respective ones of the third and fourth sealing surfaces;

disposing a cylindrical collar coaxially around the tubular member end regions for engagement with a first of said tubular members and a bearing coaxially between said collar and a second of said tubular members, said bearing having an outer surface provided with a plurality of teeth for engagement with mating teeth of a ratchet and being engageable with said second tubular member by way of a first axially extending screw thread; and ratcheting said bearing to force said opposed ends together to compress the interface member therebetween, at least one sealing surface of each pair of opposed surfaces being of a metal which is deformable under the influence of the forcing action so as to increase an area of contact between the sealing surfaces of each pair of opposed sealing surfaces, thereby to provide said metal-to-metal seals.

11. A method as claimed in claim 10 wherein the collar movably engages said first tubular member by means of an axially extending second screw thread, said first and second screw threads extending in opposite axial directions, and the step of forcing the opposed ends of the tubular members together comprises the step of disposing said substantially cylindrical collar coaxially around the opposed ends and rotating the collar around the opposed ends.

* * * * *